Aug. 8, 1961     W. B. ELMORE ET AL     2,995,298
ARITHMETIC DEVICE

Filed Dec. 27, 1954     5 Sheets-Sheet 2

STORAGE REGISTER 10

SAMPLER 24

ARITHMETIC UNIT 34

INVENTORS.
WILLIAM B. ELMORE
& MORSE MINKOW.
BY
ATTORNEY.

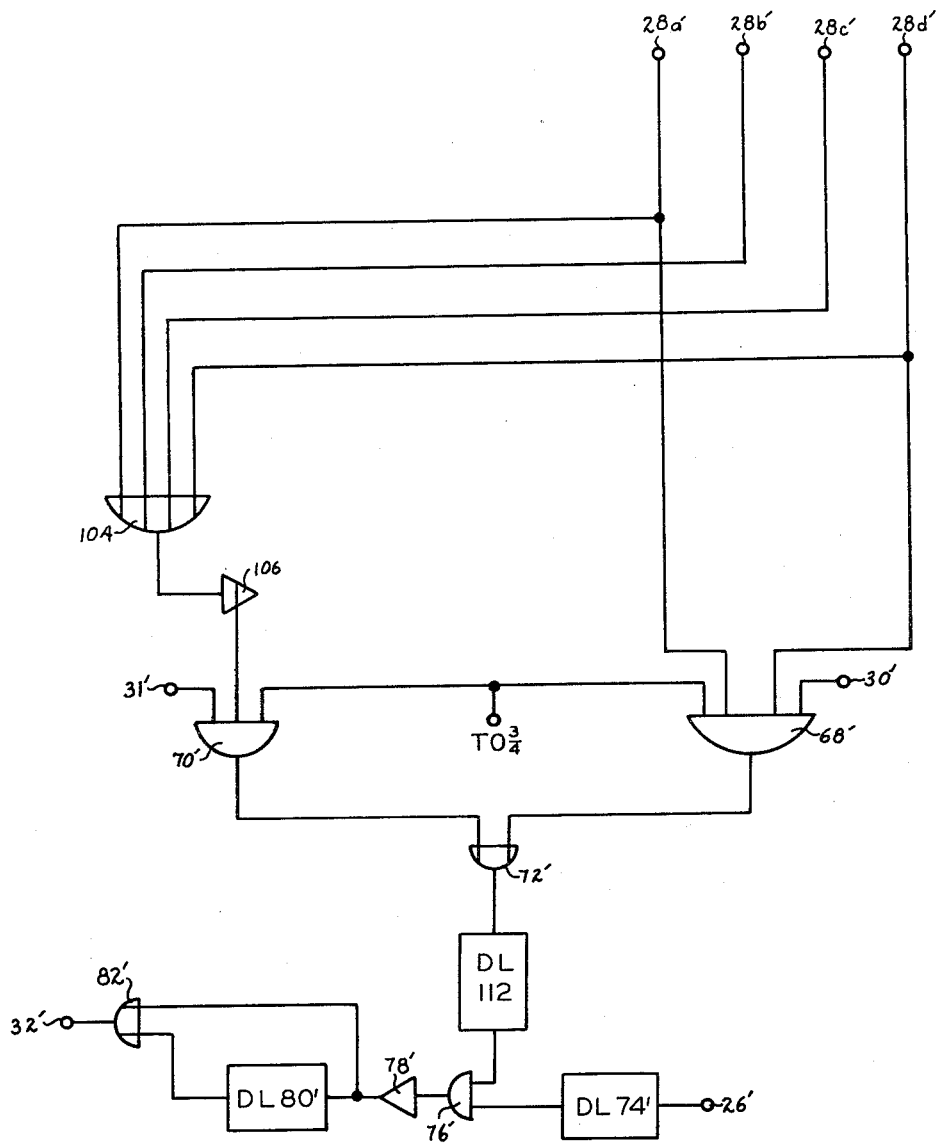

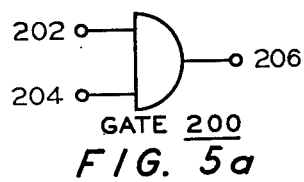
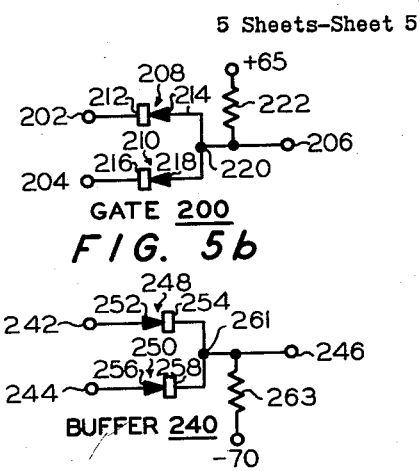
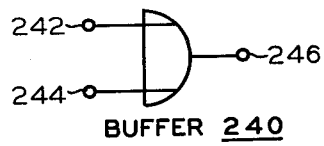
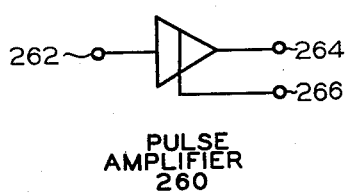
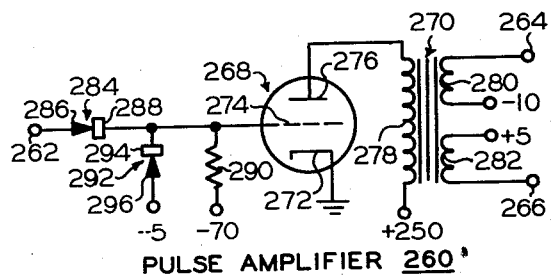
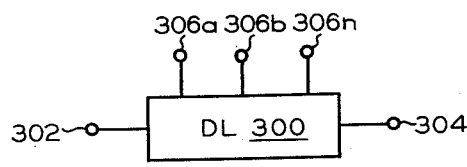
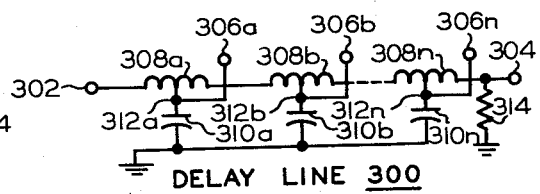
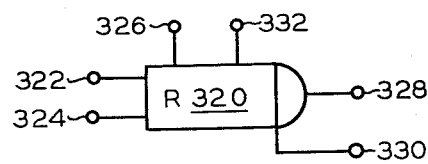
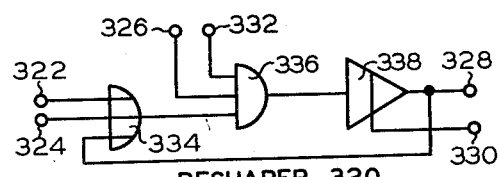
INVENTORS.
WILLIAM B. ELMORE
& MORSE MINKOW
ATTORNEY

2,995,298
ARITHMETIC DEVICE
William B. Elmore, New York, and Morse Minkow, Bronx, N.Y., assignors, by mesne assignments, to Curtiss-Wright Corporation, Carlstadt, N.J., a corporation of Delaware
Filed Dec. 27, 1954, Ser. No. 477,738
6 Claims. (Cl. 235—92)

This invention relates to apparatus for modifying groups of pulse signals which represent information in accordance with arithmetic rules, and more particularly to arithmetic devices for counting the pulse signals.

Arithmetic devices have numerous applications. In a typical application such as the recording of the number of times an event occurs the arithmetic device functions as a counter and is called a counting device. To perform the recording function it is necessary for counting devices to have an internal storage for retaining information and apparatus for changing the retained information each time the event occurs.

Since the decimal number system is most commonly used for representing information it is convenient for a counting device to be able to store representations of decimal numbers.

In the decimal system, the digits are 0, 1, 2, 3, 4, 5, 6, 7, 8, and 9. The digits zero (0) and nine (9) are the limits of the series.

A number greater than nine is expressed by more than one decimal digit. For example, the number nineteen is represented by the decimal digits one (1) and nine (9) arranged in adjacent columns as follows:

1 9

Each column has a particular significance. In the illustrated example, the number in the column on the right is understood to be multiplied by one and the number in the column to the left is understood to be multiplied by ten. The number nineteen (19) is, therefore, a shorthand representation of the numbers ten and nine which total nineteen. If a third digit were present in a column to the left of ten's column, the third digit would be understood to be multiplied by one hundred.

The notation can be generalized by the formula:

$$N = (An)10^n + (An-1)10^{n-1} + \ldots + (A1)10 + A0$$

As an example, the number five thousand four hundred and twenty-nine is actually $$5429 = 5(10^3) + 4(10^2) + 2(10^1) + 9$$
$$= 5(1000) + 4(100) + 2(10) + 9$$

The "decade" multipliers ($10^n$) are not generally written and the coefficients ($An$), represented by decimal digits of the series, are written in descending order of significance from left to right. In this manner, any decimal number can be conveniently represented.

A decimal number can be changed to the next higher decimal number by adding the decimal digit one to the original decimal number. This is known as unit addition.

To add one to a decimal number, it is generally only necessary to change the least significant decimal digit of the number to the next greater decimal digit in the series, for example:

$$17 + 1 = 18$$

An exception occurs when the least significant digit is a nine (9), the upper limit of the series of decimal digits.

In this case the nine (9) is changed to a zero (0), the lower limit of the series of decimal digits, and the next more significant decimal digit (in the column to the left) of the number is changed to the next greater decimal digit in the series, for example:

$$19 + 1 = 20$$

The shifting of the unit adding to the next more significant column is known as "carrying."

Unit subtraction is the process of subtracting the digit one from a number. During a unit subtraction it is generally only necessary to change the least significant decimal digit of the number to the next lesser decimal digit in the series, for example:

$$18 - 1 = 17$$

When, however, the least significant digit is a zero (0), the lower limit of the series, the zero (0) is changed to the upper liimt, nine (9), and a unit subtraction is performed on the next more significant digit, for example:

$$20 - 1 = 19$$

The shifting of the unit subtraction to the next more significant column is called "borrowing." The operation of unit addition or unit subtraction may hereinafter be included in the term "unit changing."

Although information is frequently represented in the decimal number system, it will be shown that the binary number system is particularly well suited for use with electrical counting devices. Consequently it is desirable to translate numbers of the decimal number system into numbers in the binary number system.

In the binary system only two digits are used, a zero (0) and a one (1) and it is possible to represent numerical information as a plurality of these two digits. In particular, the decimal digits can be coded as combinations of four binary digits. Two of the more common codes are the straight binary code and the excess-three binary code. Table I shows the coded representations of the decimal digits for the two codes.

TABLE 1

| Decimal Digit | Straight Binary Code | Excess-three Binary Code |
|---|---|---|
| 0 | 0000 | 0011 |
| 1 | 0001 | 0100 |
| 2 | 0010 | 0101 |
| 3 | 0011 | 0110 |
| 4 | 0100 | 0111 |
| 5 | 0101 | 1000 |
| 6 | 0110 | 1001 |
| 7 | 0111 | 1010 |
| 8 | 1000 | 1011 |
| 9 | 1001 | 1100 |

Of the sixteen possible combinations of four binary digits only ten are used as coded representations of the decimal digits. The ten combinations that are used are the only allowable combinations. The remaining six combinations are not allowable. The combination (1111) of binary digits is not an allowable combination for either of the codes shown in Table 1 while the combination (0000) of binary digits is an allowable combination for straight binary code but is not an allowable combination in excess-three binary code.

An advantage of the binary system is the simplicity of the arithmetic associated with binary numbers. The various arithmetic operations are summarized in Table 2.

TABLE 2

| Addition | Sum | Carry |
|---|---|---|
| 0+0 | 0 | 0 |
| 0+1 | 1 | 0 |
| 1+0 | 1 | 0 |
| 1+1 | 0 | 1 |

| Subtraction | Difference | Borrow |
|---|---|---|
| 0−0 | 0 | 0 |
| 1−1 | 0 | 0 |
| 1−0 | 1 | 0 |
| 0−1 | 1 | 1 |

"Carry" indicates adding the digit shown to the next more significant column, and "borrow" indicates subtracting the digit shown from the next more significant column.

To perform a unit addition on a binary-coded decimal number, it is normally only necessary to add 0001 to the least significant binary-coded decimal digit. An example of a unit addition for a number represented in straight binary code follows:

$$\begin{array}{r} 18=0001\ 1000 \\ +1\ \phantom{0000}\ 0001 \\ \hline 19=0001\ 1001 \end{array}$$

and in excess-three code:

$$\begin{array}{r} 18=0100\ 1011 \\ +1\ \phantom{0000}\ 0001 \\ \hline 19=0100\ 1100 \end{array}$$

One important exception to the above method of unit adding occurs when it is necessary to perform a unit addition to the decimal digit nine (9). The addition of binary one (0001) does not yield the correct sum. The correct sum is obtained when binary seven (0111) is added.

The following is an example of such an addition in straight binary code:

$$\begin{array}{r} 19=0001\ 1001 \\ +1\ \phantom{0000}\ 0111 \\ \hline 20=0010\ 0000 \end{array}$$

and in excess-three code:

$$\begin{array}{r} 19=0100\ 1100 \\ +1\ \phantom{0000}\ 0111 \\ \hline 20=0101\ 0011 \end{array}$$

It should be noted that the addition of 0111 performs two functions. The addition causes the coded representation of nine to become the coded representation of zero and creates an inter-decimal digit carry. (An inter-decimal digit carry is a carry of a binary digit from the most significant column in a binary-coded decimal digit to the least significant column of the next most significant binary-coded decimal digit.)

To perform a unit subtraction of binary-coded decimal digits, it is normally only necessary to subtract 0001 from the least significant binary-coded decimal digit. The following is an example of a unit subtraction in straight binary code:

$$\begin{array}{r} 19=0001\ 1001 \\ -1\ \phantom{0000}\ 0001 \\ \hline 18=0001\ 1000 \end{array}$$

and in excess-three binary code:

$$\begin{array}{r} 19=0100\ 1100 \\ -1\ \phantom{0000}\ 0001 \\ \hline 18=0100\ 1011 \end{array}$$

One important exception to the above method occurs when it is necessary to perform a unit subtraction from the decimal digit zero (0). The subtraction of binary one (0001) from decimal zero does not yield the correct difference. The correct difference is obtained when binary seven (0111) is subtracted from decimal zero.

The following is an example of such a subtraction in straight binary code:

$$\begin{array}{r} 20=0010\ 0000 \\ -1\ \phantom{0000}\ 0111 \\ \hline 19=0001\ 1001 \end{array}$$

and in excess-three code:

$$\begin{array}{r} 20=0101\ 0011 \\ -1\ \phantom{0000}\ 0111 \\ \hline 19=0100\ 1100 \end{array}$$

It should be noted that the subtraction of 0111 accomplishes two things. The subtraction causes the coded combination for zero to become the coded combination for nine and it creates an inter-decimal digit borrow.

In performing counting operations it is possible to use combinations of binary digits to represent decimal digits provided that the aforementioned rules of binary arithmetic are followed. The apparatus performing the operations must test the binary-coded representations for the particular combinations which require exceptions to the normal binary arithmetic operations so that the arithmetic operations can be modified.

In such counting apparatus the representing of binary numbers by electrical signals is extremely simple since the binary number system uses only two digits, zero (0) and one (1). Only two states of the signal need therefore be considered since the presence of a signal can represent a one and the absence of a signal can represent a zero. A common method of representing a number is by the temporal distribution of electrical pulses derived from series of square waves of constant frequency. The period of a pulse will hereinafter be called a pulse time. The presence of a pulse at a particular pulse time represents a one and the absence of a pulse during a particular pulse time represents a zero.

As was seen in the aforementioned arithmetic examples, the operations proceeded from right to left. Expressed otherwise, the arithmetic operations proceeded from the least significant binary digit to the most significant binary digit. Hence, the pulse patterns representing the numbers will always progress in time from least significance to most significance.

Unless otherwise indicated, when terms like digit or character are hereinafter used in connection with the operations of the apparatus, the terms will be understood to mean signals representing the digit or character.

Heretofore, serially arranged chains of trigger circuits were used as high-speed counting devices and were well suited for binary counting. However, as binary counters, such circuits could not represent information in the decimal system. Therefore, to express information in the decimal system, decoding apparatus was required for the conversion of binary numbers to decimal numbers.

There are certain instances in which sets of trigger circuits have been used as decode scaling units for expressing information in the decimal system. These units require a large amount of extra apparatus to compensate for the difference between the binary and decimal system. Thus the cost of these units has been very high.

Furthermore, most counting devices are only able to generate a sequence of numbers in one direction. That is, they can only count from a first number to a second number of greater magnitude. It is, however, often desirable to count in the opposite direction, i.e., from a first number to a second of lesser magnitude.

It is accordingly an object of the invention to provide an improved counting device.

Another object of the invention is to provide an improved counting device which can readily change the direction of the count for ascending order to descending order.

A further object of the invention is to provide an improved counting device which generates binary-coded decimal numbers.

Briefly, a counting device in accordance with the invention comprises apparatus for storing a number, apparatus for testing the stored number and apparatus for changing the magnitude of the stored number. Control apparatus conditions the testing and changing apparatus to perform a change in the magnitude of the number in either an increasing or decreasing direction. During the actual changing of the magnitude of the number the testing apparatus may control the changing apparatus to perform the change in one of several manners depending upon the magnitude of the stored number.

An advantage of a counting device of the invention is that a minimum amount of apparatus is required to make the counting device perform in either of two directions. The fact that the addend or subtrahend is unity and is represented as 0001, even in excess-three operation where 0100 would normally be used, leads to considerable simplification.

Other objects and advantages of the invention will appear in the subsequent detailed description which is accompanied by drawings wherein:

FIG. 1 is a block diagram of a counting device applicable to both excess-three and straight binary-coded decimal operation, in accordance with the invention, wherein double-arrowheaded lines indicate control lines and single arrowheaded lines indicate information lines.

FIGS 2a–c show the symbolic equivalents of the blocks shown in FIG. 1.

FIG. 2a symbolically represents the details of the storage register of FIG. 1.

FIG. 4 shows a sampler suitable for testing straight binary-coded decimal digits.

FIG. 5a illustrates the symbol which represents a coincidence ("and") gate.

FIG. 5b shows the schematic details of the coincidence gate of FIG. 5a.

FIG. 6a indicates the symbol which stands for a buffer ("or") gate.

FIG. 6b shows the schematic details for the buffer of FIG. 6a.

FIG. 7a illustrates the symbols employed to signify a pulse amplifier.

FIG. 7b shows schematically the pulse amplifier of FIG. 7a.

FIG. 8a is a symbolic representation of a delay line.

FIG. 8b indicates the schematic details of the delay line shown in FIG. 8a.

FIG. 9a shows the symbol used for a reshaper.

FIG. 9b symbolically shows the details for the reshaper of FIG. 9a.

Figure 1:
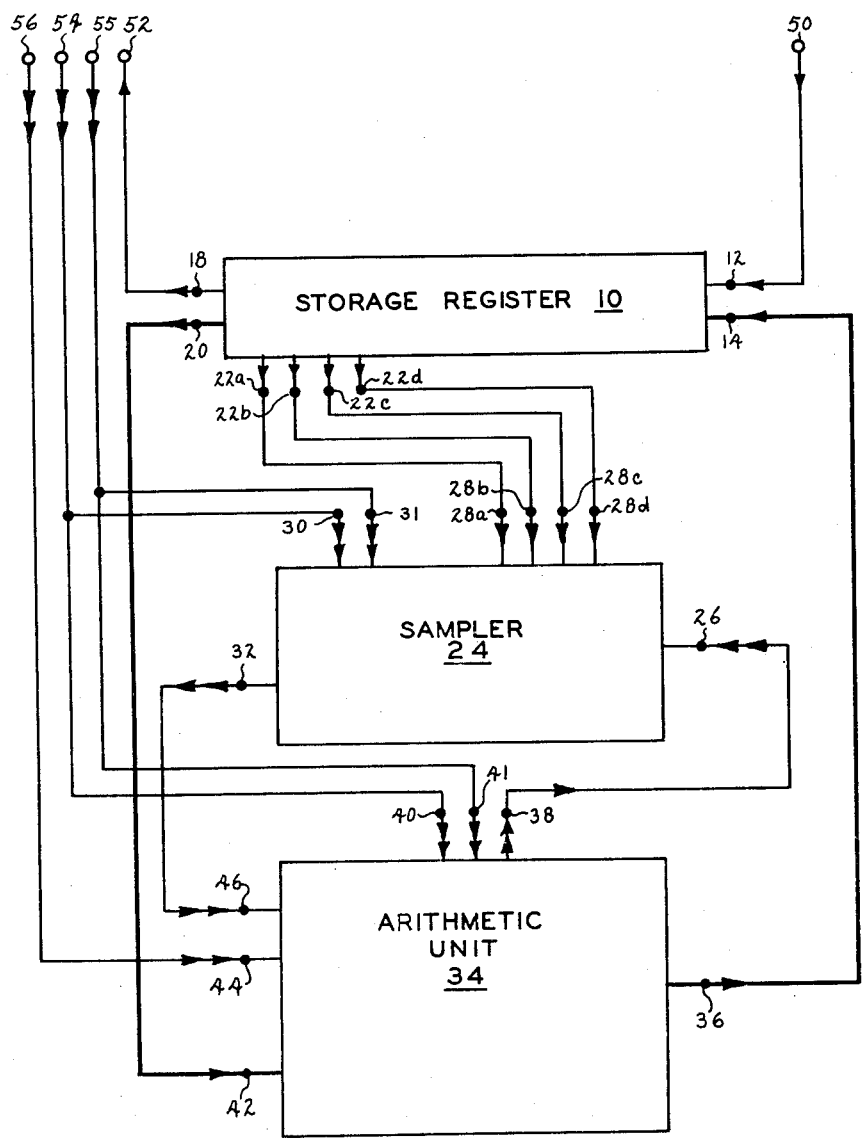

Referring now to the apparatus in FIG. 1, a counting device of the invention will be described, for illustrative purposes, as functioning with an electronic digital computer.

The counting device comprises: a storage register 10 having input terminals 12 and 14, output terminals 18 and 20, and sampling terminals 22; a sampler 24 having priming terminal 26, sample-input terminals 28, control terminals 30 and 31, and output terminal 32; and an arithmetic unit 34 having result terminal 36, priming output terminal 38, control terminals 40 and 41, number terminal 42, unit-change terminal 44 and remodification terminal 46.

The counting device is connected to the computer (not shown) via original-number terminal 50, receiving terminal 52, control-output terminals 54 and 55 and unit-change output terminal 56.

The counting process begins when the starting number, represented by a pulse pattern, is transmitted from original-number terminal 50 via input terminal 12 to storage register 10. The pulse pattern passes through storage register 10 to output terminal 20 and is fed via number terminal 42 to arithmetic unit 34. The pulse pattern leaves arithmetic unit 34 at result terminal 36 and is fed back via input terminal 14 to storage register 10. The pulse pattern continues to circulate in this manner between storage register 10 and arithmetic unit 34.

When the counting device is to be used for counting in ascending order (addition), a signal of a positive polarity is fed from control-output terminal 54 via control terminal 30 to sampler 24 and via control terminal 40 to arithmetic unit 34. A signal of negative polarity is fed from control-output terminal 55 via control terminal 31 to sampler 24 and via control terminal 41 to arithmetic unit 34. The control signals cause arithmetic unit 34 to function as a unit adder and permit sampler 24 to test for the binary-coded (excess-three or straight binary) combination of decimal nine.

When the count is to be increased, a pulse from unit-change output terminal 56 is fed via unit-change terminal 44 to arithmetic unit 34 to initiate an addition cycle. The pulse causes the arithmetic unit 34 to add binary one to the least significant bit of the least significant digit of the stored number and also to generate a pulse which is fed to priming output terminal 38. The pulse from priming output terminal 38 is fed via priming terminal 26 to sampler 24.

Signals are continuously fed from storage register 10 via sampling terminals 22 and sample-input terminals 28 to sampler 24. These signals indicate the pulse pattern of the digits stored in storage register 10. When the pulse enters priming terminal 26, the signals present at sample-input terminals 28 indicate the least significant digit of the number stored. If this digit is not decimal nine, no further changes are made on the stored number and the unit addition is complete. If the digit is decimal nine, signals are generated by sampler 24 and are fed via output terminal 32 to remodification terminal 46 causing binary ones to be added to the second and third least significant bits of the least significant digit. Upon completion of the addition, the modified number continues to circulate in the manner previously explained.

For counting in descending order, the polarities of the signals at control-output terminals 54 and 55 are interchanged to cause arithmetic unit 34 to function as a unit subtractor and to permit sampler 24 to test for coded combinations of decimal zero.

Although the signals from control-output terminals 54 and 55 are shown as being generated in the computer it should be apparent to those skilled in the art that a simple switching scheme can accomplish the same result. A common double pole double throw toggle switch can be used with the movable contacts being fed to control-output terminals 54 and 55 and the fixed contacts being returned to the proper voltage supplies.

Whenever the count is to be decreased, a pulse from unit-change output terminal 56 is fed via unit-change terminal 44 to arithmetic unit 34 to initiate the subtraction cycle. The pulse causes the arithmetic unit 34 to subtract binary one from the least significant bit of the least significant digit and also to generate a pulse which is fed to priming-output terminal 38. The pulse from priming-output terminal 38 is fed via priming terminal 26 to sampler 24. If the signals present at sample input terminals 28 at this time indicate that the coded representation of the least significant digit is not decimal zero, the subtraction is complete. If, however, the signals indicate that the least significant digit is decimal zero, signals are generated by sampler 24 and fed via output terminal 32 to remodification terminal 46 causing binary ones to be subtracted from the second and third least significant bits of the least significant digit. Upon completion of the subtraction, the modified number continues to circulate as before. Since the number is continuously circulating, the number is always available for transmission from the storage register 10 via output terminal 18 and receiving terminal 52 to the computer.

Figure 2A:
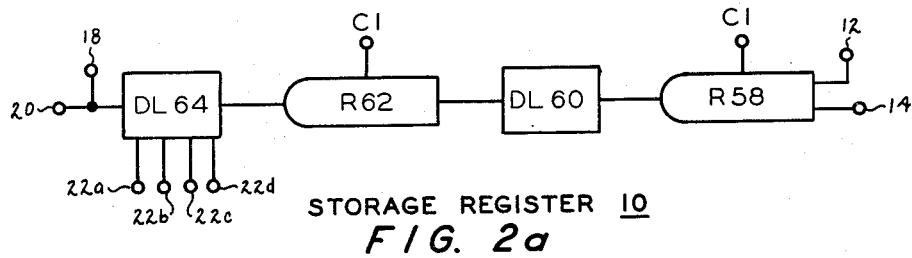
FIG. 2b shows, in symbolic form, the details of the sampler of FIG. 1. The sampler is suitable for testing excess-three coded decimal digits.
FIG. 2c is the symbolic representation of the details of the arithmetic unit of FIG. 1.
Figure 2B:
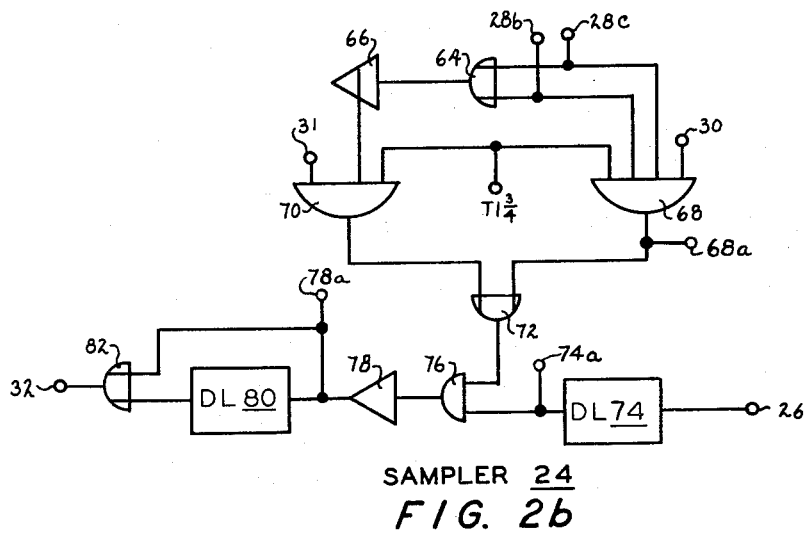
Figure 2C:
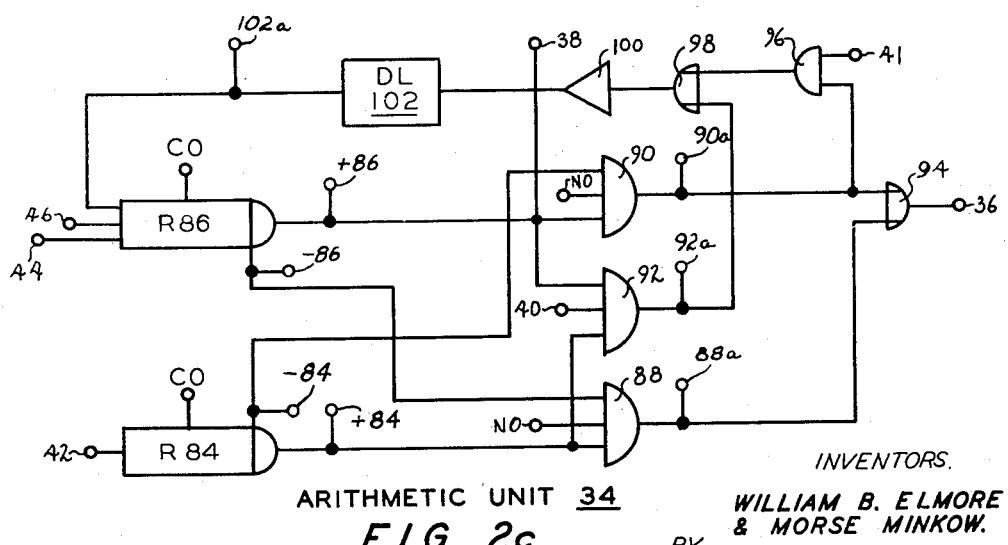

The details of the components of the counting device will next be described with reference to FIGS. 2a–c. FIGS. 2a–c illustrate the details of the components by the use of logical symbols. Detailed descriptions of the elements which are represented by logical symbols are hereinafter included.

It should be noted that since pulses and signals which represent information are identifiable by their position in time, precisely timed pulses are required with which to manipulate selected portions of the information. Such pulses are usually referred to as timing and clocking pulses and are conveniently supplied by the timing unit of the computer. A suitable timing unit can be found in the copending application of A. A. Auerbach et al., Serial No. 471,696, filed November 29, 1954, now Patent 2,902,686, granted on September 1, 1959.

As shown in FIG. 2a, the storage register 10 comprises a reshaper 58 having input terminals 12 and 14, a delay line 60, a reshaper 62 and a delay line 64 with output terminals 18 and 20 and sample terminals 22a–d.

Reshapers 58 and 62 are electronic circuits which respond to distorted square-wave pulses by transmitting pulses which are similar in shape to the original square-wave pulses. During the process of reshaping the pulses, each pulse is delayed for a quarter of a pulse time.

Delay lines 60 and 64 are electrical networks which receive signals and delay the transmission of these signals for a predetermined time. The amount of time a signal is delayed is measured in pulse times. Each pulse time of delay provides for the storage of one bit.

Signals in the form of a serially arranged pulse pattern enter storage register 10 via input terminals 12 or 14. Input terminal 12 is used at the start of the counting operation to enter a number into the counting device. Input terminal 14 is the recirculation input terminal.

Reshaper 58 reshapes the pulses of the pattern and, after a quarter of a pulse time of delay, feeds the pulses to delay line 60. Delay line 60 delays the pulses three and three-quarters pulse times and feeds the pulses to reshaper 62. After a quarter of a pulse time delay, the pulses are fed by reshaper 62 to delay line 64 and are additionally delayed for three and a half pulse times. The pulses leave the storage register 10 via output terminals 18 and 20 after having been delayed a total of seven and three quarters pulse times. Thus it is possible to store substantially eight bits in storage register 10.

Sampling terminals 22 are taps on delay line 64. Signals present at sampling terminal 22d are delayed one-half of a pulse time in delay line 64; at sampling terminal 22c, the signals are delayed one and a half pulse times; at sampling terminal 22b, two and a half pulse times; and at sampling terminal 22a, three and a half pulse times. Therefore, since the bits representing a number circulate with the least significant bit first, the four bits of the least significant digit are simultaneously present at the sampling terminals 22 when the least significant bit is at sampling terminal 22a. As will be seen hereinafter, in the case of straight binary coding it is necessary to test the decimal digit at a time $t0¾$ when all four of its bits are simultaneously present at the sampling terminals. In the case of excess-three coding, it is merely necessary to test the two most significant bits. This may be and in fact is done one pulse time later, at a time $t1¾$, whence the two most significant bits are available at the terminals 22c and 22b respectively.

Sampler 24, as shown in FIG. 2b, is capable of testing excess-three coded decimal digits. Sampler 24 comprises the buffers 64, 72 and 82, the gates 68, 70 and 76, delay lines 74 and 80 and pulse amplifiers 66 and 78.

The buffers 64, 72 and 82 each transmit a positive output signal when any one of its associated input terminals are at a positive potential. Each of the gates 68, 70 and 76 transmits a positive output signal only when all of its associated input terminals are at a positive potential. Delay line 74 delays signals for three quarters of a pulse time. Delay line 80 delays signals for one pulse time. Pulse amplifier 66 is used as an inverting amplifier to change the polarities of signals, and pulse amplifier 78 is used as an impedance transfer. The buffers, gates, delay lines and pulse amplifiers are hereinafter described in detail.

When the counting device is counting in ascending order, a positive signal will be present at control terminal 30 and a negative signal will be present at control terminal 31. Thus add gate 68 is activated (i.e., the potential of the output signal is dependent on the potential of the remainder of the input signals) and subtract gate 70 deactivated (i.e., there cannot be a positive output signal regardless of the potential of the remaining input signals). Sample-input terminals 28b and 28c continually receive information which is sent to add gate 68.

Every four pulse times, the signal $T1¾$ is generated by the timing unit. The number in storage register 10 is so synchronized that $T1¾$ occurs whenever the two most significant bits of a digit are present at sample-input terminals 28b and 28c. The excess-three code in Table I shows that the only number for which both of these bits are binary ones is decimal nine. Hence, when decimal nine is sampled, positive signals are present at sample-input terminals 28b and 28c and a pulse is passed through add gate 68 to its output terminal 68a. This pulse is fed via buffer 72 to an input terminal of the gate 76.

When a unit addition is to be performed, a pulse is present at priming terminal 26. The pulse is delayed three-quarters of a pulse time by delay line 74 for synchronization with pulses from buffer 72. When simultaneously a pulse is passed by buffer 72, a pulse is passed by delay line 74 to its output terminal 74a and a pulse is passed through gate 76 to pulse amplifier 78. Pulse amplifier 78 generates a pulse on its output terminal 78a which pulse passes through buffer 82. The pulse also enters delay line 80. One pulse time later the pulse leaves delay line 80 and passes through buffer 82 to output terminal 32.

Hence, whenever a unit addition is performed and the pulses representing decimal nine are present at sample-input terminals 28b and 28c at time $T1¾$, two pulses are serially transmitted from output terminal 32. One pulse is transmitted three quarters of a pulse time after a pulse is received at priming terminal 26 and the second pulse is transmitted one and three quarters of a pulse time after the pulse is received at priming terminal 26.

During unit subtraction, there is a negative signal at control terminal 30 deactivating add gate 68 and a positive signal present at control terminal 31 activating subtract gate 70. As was stated above, the $T1¾$ signal occurs when the two most significant bits of a digit are present at sample input terminals 28b and 28c. If these bits are binary zeros, no pulse is fed via buffer 64 to pulse amplifier 66. Since pulse amplifier 66 functions as an inverting amplifier, the output terminal of pulse amplifier 66 is therefore at a positive potential and permits the $T1¾$ pulse to be gated through subtract gate 70 to buffer 72. Thereafter, the sampler 24 operates in the same way as during a unit addition.

Table I shows that decimal zero is the only excess-three coded representation which has binary zeros in the two most significant bit positions. Thus $T1¾$ is passed to buffer 72 whenever subtract gate 70 is activated and decimal zero is sampled. Hence, except for the switching of the testing from add gate 68 to subtract gate 70, the sampler 24 works exactly the same for unit addition and unit subtraction.

It is seen that in the case of addition, the positive signal applied to terminal 30 of gate 68 "sets" decimal nine into sampler 24, so that the sampler tests each decimal denominational digit of the original operand number stored in storage register 10 to determine whether or not such digit is nine. Similarly, in the case of subtraction, application of the positive signal to terminal 31 of gate 70 sets decimal zero into the sampler.

The arithmetic unit 34 of FIG. 2c comprises number reshaper 84, unit reshaper 86, gates 88 and 90, carry gate 92, output buffer 94, borrow gate 96, buffer 98, pulse amplifier 100 and delay line 102.

Reshapers 84 and 86 receive signals at their input terminals and after a one-quarter pulse time delay generate signals at their output terminals. Each reshaper has two output terminals, a positive output terminal +84 or +86 respectively, and a negative output terminal −84 and −86 respectively. When a pulse is received by the input terminal of a reshaper, the positive output terminal which is normally at a negative potential assumes a positive potential for half a pulse time and the negative output terminal which is normally at a positive potential assumes a negative potential for half a pulse time.

Delay line 102 provides three-quarters of a pulse time delay for signals received by its input terminal before they are present at its output terminal 102a and the gates and buffers operate in the same manner as those described above.

During a unit addition, a signal of positive potential is present at control terminal 40 activating carry gate 92 and a signal of negative potential is present at control terminal 41 deactivating or blocking the borrow gate 96. Arithmetic unit 34 is thus conditioned to function as a unit adder.

Reshapers 84 and 86 receive the operands for the addition. The signal transmitted from the output terminal of buffer 94 represents the sum and the signal passed by delay line 102 represents the carry.

The operation of the counting device will now be described with reference to the several combinations of least significant bits (as distinguished from decimal values) of the addend and augend or minuend and subtrahend, i.e. 0±0, 0±1, 1±0, 1±1.

During the operation of 0+0, there is no signal present at the input terminals of number reshaper 84 and unit reshaper 86. Therefore, the positive output terminal +84 of number reshaper 84 is at a negative potential and blocks gate 88. The positive output terminal +86 of unit reshaper 86 is also at a negative potential and blocks gate 90. Hence, no pulse is fed via either of the gates 88 or 90 via their respective output terminals 88a and 90a to buffer 94 which therefore transmits a negative potential to indicate that the sum is zero.

During the operation 0+1, no pulse is fed to the input terminal 42 of number reshaper 84 but a unit change pulse is fed to an input terminal 44 of unit reshaper 86. The positive output terminal of number reshaper 86 and the negative output terminal of unit reshaper 84 are both at positive potential and allow an N0 pulse (generated by the timing unit as will hereinafter be discussed in detail) to be gated through gate 90 to buffer 94. The buffer 94 transmits a pulse indicating that the sum is one.

During operation 1+0, a pulse is fed to the input terminal of number reshaper 84 but no pulse is fed to any of the input terminals of unit reshaper 86. As a result the positive output terminal of number reshaper 84 and the negative output terminal of unit reshaper 86 are at a positive potential and permit an N0 pulse to be gated through gate 88 to buffer 94. The buffer 94 transmits the pulse to indicate that the sum is one.

During the operation 1+1, there are pulses present at the input terminal of number reshaper 84 and an input terminal of unit reshaper 86. The negative output terminal unit reshaper 86 is at a negative potential and blocks gate 88 and the negative output terminal of number reshaper 84 is at a negative potential and blocks gate 90. Hence, a negative potential is passed to buffer 94 and indicates that the sum is zero.

Since the positive output terminal of both reshaper 84 and 86 and control terminal 40 are at a positive potential a pulse passes through the carry gate 92 to its output terminal 92a and through buffer 98 to pulse amplifier 100. The pulse transmitted from the output terminal of pulse amplifier 100 is delayed three-quarters of a pulse time by delay line 102 and is fed back to unit reshaper 86 thus generating the carry. Thus arithmetic unit 34 can perform the operations of unit addition. If the unit change desired is a unit subtraction it is only necessary to change the polarity of the control signals as will now be shown.

When arithmetic unit 34 is to operate as a unit subtractor, a signal of negative potential at control terminal 40 blocks carry gate 92 and a signal of positive potential at control terminal 41 activates borrow gate 96.

The four conditions which occur in binary subtraction as shown in Table II, will now be described with reference to arithmetic unit 34.

Reshapers 84 and 86 receive the operands for subtraction. The signal transmitted from the output terminal of buffer 94 is the difference and the signal passed by delay line 102 is the borrow.

During the operation 0−0, there is no signal present at the input terminals of number reshaper 84 and unit reshaper 86, therefore their respective positive output terminals are at negative potential and no pulse is passed by either gate 88 or gate 90. Hence no pulse is fed at the output of buffer 94 indicating the difference is zero.

During the operation 1−1, there is a signal present at the input terminals of number reshaper 84 and unit reshaper 86, therefore their respective negative output terminals are at a negative potential and no pulse is passed by either gate 88 or gate 90 to buffer 94. Hence no pulse is present at the output terminal of buffer 94 indicating the difference is zero.

During the operation 1−0, there is a signal present at the input terminal of number reshaper 84 and no pulse present at the input terminal of unit reshaper 86. The positive output terminal of number reshaper 84 and the negative output terminal of unit reshaper 86 are both at positive potentials permitting an N0 pulse to be gated through gate 88 to buffer 94 indicating the difference is one.

During the operation 0−1, there is no signal present at the input terminal of number reshaper 84 and a signal is present at the input terminal of unit reshaper 86. The positive output terminal of unit reshaper 86 and the negative output terminal of number reshaper 84 are both at a positive potential permitting an N0 pulse to be gated through gate 90. The N0 pulse passes through buffer 94 indicating a difference of one. The N0 pulse from gate 90 is also gated through borrow gate 96 and buffer 98 to pulse amplifier 100. The pulse amplified by pulse amplifier 100 is delayed three quarters of a pulse time by delay line 102 and fed back to unit reshaper 86 thus generating a borrow.

Figure 3:
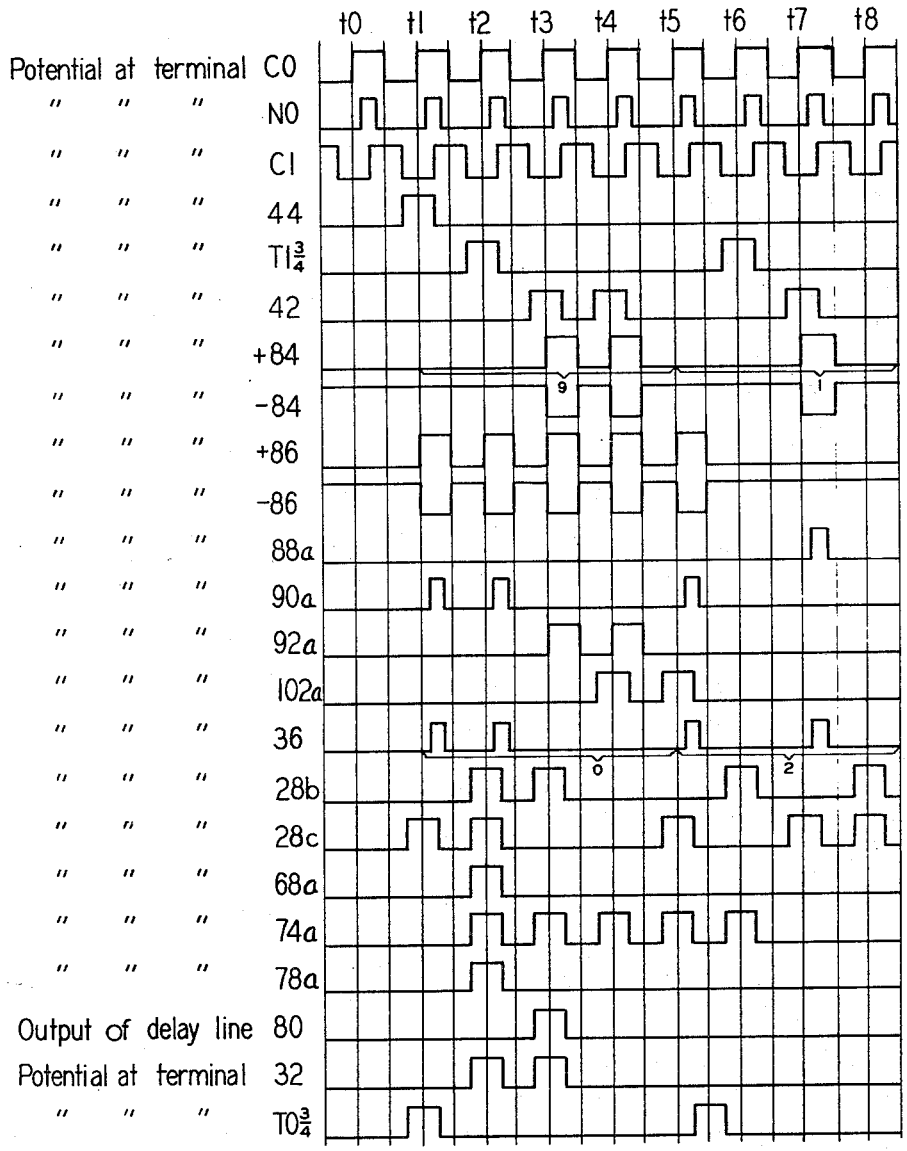
FIG. 3 illustrates representative waveforms associated with the counting device.

As an example of the functioning of the counting device, FIG. 3 shows the waveforms at various locations within the counting device for the addition of one to nineteen and will be explained with reference to FIGS. 2a–c. The abscissa of the chart is measured in units of time which are indicated sequentially from left to right. Thus, for example, excess-three binary coded nineteen is written as 0100 1100 but is represented on the chart as 0011 0010.

Several standard timing and clocking waveforms are used in the counting device designated as C0, N0, C1 and T1¾. C0 is a series of square-wave pulses which occur at a constant frequency. N0 is a series of pulses each having one half of the width of a C0 pulse and occurring at the same frequency as C0 pulses. The N0 pulses are centered timewise in the C0 pulses. C1 pulses are identical to C0 pulses in amplitude and frequency but are shifted to positions which are a one-quarter of a pulse time later in phase. The T1¾ pulses are pulses occurring every fourth pulse time. The T1¾ pulses occur one-quarter of a pulse time earlier than their associated C0 pulses.

Numbers are introduced into the storage register 10 under control of the computer and the counting device is synchronized with the timing generator of the computer. The initiation of a unit change is controlled by the computer so that the unit-change operation begins when the least significant bit of the number stored in the storage register enters the artithmetic unit 34.

In the description of the timing wave-forms of FIG. 3, timing will be referred to the ordinates of the chart which are designated $tn$; $n$ represents the number of pulse times which have elapsed. The waveforms will refer to potentials at designated locations of FIG. 2.

At $t0¾$ a pulse enters unit-change reshaper 86 via unit change terminal 44. One quarter pulse time later, at substantially $t1$, a positive pulse is fed from the positive output terminal +86 of unit-change reshaper 86 to gate 90 and gates an N0 pulse through gate 90 to output buffer 94 which thus transmits the N0 pulse to represent the least significant bit of the sum. The sum enters storage register 10 via result terminal 36 and input terminal 14.

The output pulse generated at the positive output terminal +86 of reshaper 86 is also fed via priming output terminal 38 to priming terminal 26 of sampler 24. After leaving priming terminal 26, the pulse is delayed three quarters of a pulse time by delay line 74 and is present at gate 76 at $t1¾$.

At $t1¾$, pulses are present at sample-input terminals 28$b$ and 28$c$, hence a $t1¾$ pulse is passed through add gate 68 and buffer 72. With pulses present at both input terminals of gate 76 at $t1¾$, a pulse is passed to pulse amplifier 78. The pulse generated by pulse amplifier 78 is fed via buffer 82, output terminal 32 and remodification terminal 46 to unit-change reshaper 86.

In response to this remodification pulse, at $t2$ a pulse is transmitted from the positive output terminal +86 of unit-change reshaper 86 and gates an N0 pulse through gate 90 to output buffer 94 to form the second least significant bit of the sum. At $t2¾$, the $t1¾$ pulse fed into delay line 80 from pulse amplifier 78 appears at buffer 82 and is fed to unit-change reshaper 86 via output terminal 32 and remodification terminal 46. Simultaneously at $t2¾$, a pulse from storage register 10 is fed via output terminal 20 and number terminal 42 to number reshaper 84.

It is thus seen that the initial unit change of the least significant decimal digit of the original operand number (engendered via unit change terminal 44 of reshaper 86), and the further change therein (engendered via remodification terminal 46) are performed in a single pass through arithmetic unit 34. As used in the claims, the term "single pass" shall not necessarily be limited to operations on dynamic numbers.

In response to the two pulses generated at $t2¾$, at $t3$ the negative output terminals −84 and −86 of reshapers 84 and 86 feed negative potentials to input terminals of gates 90 and 88, and the N0 pulse is prevented from being fed to output buffer 94. Hence, the third least significant bit is binary zero. However, at $t3$, the positive output terminals +84 and +86 of reshapers 84 and 86 transmit positive pulses. Therefore, a pulse is passed by carry gate 92 through buffer 98 and pulse amplifier 100 to delay line 102. After three quarters of a pulse time delay, the pulse is fed to unit change reshaper 86 at $t3¾$.

At $t3¾$, a pulse is fed to number reshaper 84 from storage register 10 and the same series of steps occur as did at $t2¾$ resulting in the formation of binary zero as the fourth least significant bit and the passage of a pulse through carry gate 92.

At $t4¾$, the carry pulse is transmitted to unit-change reshaper 86 from delay line 102 and a negative signal is fed to number reshaper 84. At $t5$, in response to the carry pulse, a positive potential is fed from the output terminal of unit-change reshaper 86 to gate 90 permitting an N0 pulse to be passed by gate 90. The pulse is then fed to output buffer 94 to form the fifth least significant bit of the sum. At $t5¾$ negative potentials are present at the input terminal of the reshapers 84 and 86. Hence, a negative potential is generated by gates 88 and 90. Thus, the sixth least significant bit is represented as is zero.

At $t6¾$ storage register 10 feeds a pulse to number reshaper 84. Hence, at $t7$, an N0 pulse is gated through gate 88 and output buffer 94 so that the seventh least significant bit is binary one. Finally, since no pulses are present at reshapers 84 and 86, at $t7¾$, a negative potential is gated to output buffer 94 at $t8$ and the most significant bit of the sum is binary zero.

The sum continues to circulate through storage register 10 and arithmetic unit 34 until the next change is initiated by a signal from the computer.

FIG. 4 shows a sampler 24' suitable for use with straight binary-coded digits. Sampler 24' comprises sample-input terminals 28', a buffer 104, a pulse amplifier 106 and a gate 70' which test for straight binary-coded zero. The sampler 24' includes a gate 68' to test for straight binary-coded nine and a delay line 112. The remaining components of sampler 24' are equivalent to apparatus previously described and are buffer 72', delay line 74', gate 76', pulse amplifier 78', delay line 80' and buffer 82'.

Since the coding of decimal digits in straight binary code is different from coding in the excess-three binary code, the arrangement of the sampling gates 68' and 70' must be modified to test for bits representing digits in straight binary code. Otherwise the sampler 24' operates the same as sampler 24 previously described. Hence, only the actual testing of digits by sampling gate 68' and 70' will be described.

During a unit subtraction, a positive signal is present at control terminal 31' and activates gate 70'. A negative signal is present at control terminal 30' and deactivates gate 68'. Sample-input terminals 28' receive signals representing the four bits of a digit stored in the storage register 10. At $t0¾$, the pulses of a coded decimal digit are properly oriented at the sample-input terminals 28'. If no pulses are present at sample input terminal 28', indicating decimal zero, a negative signal is fed via buffer 104 to pulse amplifier 106. Therefore, the output terminal of pulse amplifier 106 is positive and allows a T0¾ pulse to pass through gate 70'. The pulse is fed to delay line 112 via buffer 72'. Delay line 112 delays the pulse one pulse time before the pulse is fed to gate 76'. Delay line 112 delays the pulse so that it will be in synchronism with pulses received from delay line 74'. After the pulse passes through delay line 112, the sampler 24' operates exactly like sampler 24. It will be recalled that in the case of excess-three coding the sampler 24 tested for decimal nine or zero at $t1¾$, one pulse time later than the testing time of sampler 24' ($t0¾$). The insertion of delay line 112 restores, onward thereof, the time relations of operations.

During a unit addition, a positive signal at control input terminal 30' activates gate 68' and a negative signal at control input terminal 31' deactivates gate 70'. If at T0¾, pulses are present at 28a' and 28d' a T0¾ pulse is passed through gate 68' to buffer 72', indicating the presence of a straight binary-coded nine.

It has thus been shown how samplers can be designed to test for decimal nine in the straight and excess-three binary codes. Although only two types of samplers have been shown it will be obvious to those skilled in the art that samplers can be constructed to test for any coded digit.

The counting device described is capable of handling numbers comprising two decimal digits. To accommodate larger numbers, the capacity of the storage unit is increased by adding additional delay lines and reshapers.

A highly versatile counting device has been shown. The counting device is capable of initiating operation with any selected number and of counting in either ascending or descending order. With such a counting device, it is possible at any time during operation to change the direction in which the count is progressing.

Description of symbols

The schematic equivalents of the symbols which are hereinafter employed to simplify the detailed description of the units of the counting device which have been illustrated in block form are shown in FIGS. 2 and 4. For convenient reference, all positive and negative supply buses will generally be identified with a number corresponding with their voltage.

Gate

The gates used in the apparatus are of the "coincidence" type, each comprising a crystal diode network which functions to receive input signals via a plurality of input terminals and to pass the most negative of the input signals.

The symbol for a representative gate 200, having two input terminals 202 and 204, is shown in FIG. 5a. Typical signal potential levels are plus five volts (positive signals) and minus ten volts (negative signals). The potentials of the signals which may exist at the input terminals 202 and 204 are limited to above levels.

If a potential of minus ten volts is present at one or both of the input terminals 202 and 204, a potential of minus ten volts exists at the output terminal 206. Therefore, if one of the input signals to the input terminals 202 and 204 is positive and the other signal is negative, the negative signal is passed and the positive signal is "blocked."

When there is a coincidence of positive signals at the two input terminals 202 and 204, a positive signal is transmitted from the output terminal 206. In such case, it may be stated that a positive signal is "gated" or "passed" by the gate 200.

The schematic details of the gate 200 are shown in FIG. 5b. Gate 200 includes the crystal diodes 208 and 210. Each of the input terminals 202 and 204 is coupled to one of the crystal diodes 208 and 210. Crystal diode 208 comprises the cathode 212 and the anode 214. Crystal diode 210 comprises the anode 218 and the cathode 216. More particularly, the input terminals 202 and 204 are respectively coupled to the cathode 212 of the crystal diode 208 and the cathode 216 of the crystal diode 210. The anode 214 of the crystal diode 208 and the anode 218 of the crystal diode 210 are interconnected at the junction 220. The anodes 214 and 218 are coupled via the resistor 222 to the positive voltage bus 65.

If negative potentials are simultaneously present at the input terminals 202 and 204, both of the crystal diodes 208 and 210 conduct, since the positive supply bus 65 tends to maintain the anodes 214 and 218 more positive than their respective cathodes 212 and 216. The voltage at the junction 220 will then be slightly more positive than minus ten volts since, while conducting, the anodes 214 and 218 of the crystal diodes 208 and 210 assume the potential of the associated cathodes 212 and 216 plus a small voltage drop.

When a positive signal is fed only to the input terminal 202, the cathode 212 is raised to a positive five volts potential and is made more positive than the anode 214, so that crystal diode 208 stops conducting. But since the signal at input terminal 204 is still at the negative ten volts level, the potential at the junction 220 remains at the negative ten volts level. In a similar manner, when a positive signal is only present at the input terminal 204, the voltage at the junction 220 will not be changed.

When the signals present at both input terminals 202 and 204 are positive, the anodes 214 and 218 are raised to approximately the same potential as their associated cathodes 212 and 216 and the potential at the junction 220 rises to a positive potential of five volts.

The potential which exists at the junction 220 is transmitted from the gate 200 via the connected output terminal 206.

In the above described manner, the gate 200 is frequently used as a switch to govern the passage of one signal by the presence of one or more signals which control the operation of the gate 200.

It should be understood that the potentials of plus five volts and minus ten volts used for purpose of illustration are approximate, and the exact potentials will be affected in two ways. First, they will be affected by the value of the resistance 222 and its relation to the impedances of the input circuits connected to the input terminals 202 and 204. Second, they will be affected by the fact that a crystal diode has some resistance (i.e., is not a perfect conductor) when its anode is more positive than its cathode, and furthermore will pass some current (i.e., does not have infinite resistance) when its anode is more negative than its cathode. Nevertheless, the assumption that signal potentials are either plus five or minus ten volts is sufficiently accurate to serve as a basis for the description of the operations taking place in the apparatus.

A clamping diode may be connected to the output terminal 206 to prevent the terminal from becoming more negative than a predetermined voltage level to protect the diodes 208 and 210 against excessive back voltages and to provide the proper voltage levels for succeeding circuits.

Although gate 200 is shown with only two input terminals 202 and 204 it should be realized that more input terminals can be used; each input terminal being connected to the cathode of a separate diode and the anodes of all diodes being connected to junction 220.

Buffer

The buffers used in the apparatus are also known as "or" gates. Each buffer comprises a crystal diode network which functions to receive input signals via a plurality of input terminals and to pass the most positve of the input signals.

The symbol for a representative buffer 240, having two input terminals 242 and 244, is shown in FIG. 6a. Since the signal potential levels in the system are minus ten volts and plus five volts, either one of these potentials may exist at the input terminals 242 and 244.

If a positive potential of five volts exists at one or both of the input terminals 242 or 244, a positive potential of five volts exists at the output terminal 246. If a negative potential of ten volts is present at both of the input terminals 242 and 244, a negative potential of ten volts will be present at the output terminal 246.

The schematic details of the buffer 240 are shown in FIG. 6b. The buffer 240 includes the two crystal diodes 248 and 250. The crystal diode 248 comprises the anode 252 and the cathode 254. Crystal diode 250 comprises the anode 256 and the cathode 258. The anode 252 of the crystal diode 248 is coupled to the input terminal 242. The anode 256 of the crystal diode 250 is coupled to the input terminal 244. The cathodes 254 and 258 of the crystal diodes 248 and 250, respectively, are joined at the junction 261 which is coupled to the output terminal 246, and via the resistor 263 to the negative supply bus 70. The negative supply bus 70 tends to maintain the cathodes 254 and 258 more negative than the anodes 252 and 256, respectively, causing both crystal diodes 248 and 250 to conduct.

When negative ten volt signals are simultaneously present at input terminals 242 and 244, the crystal diodes 248 and 250 are conductive, and the potential at the cathodes 254 and 258 approaches the magnitude of the potential at the anodes 252 and 256. As a result, a negative potential of ten volts appears at the output terminal 246.

If the potential at one of the input terminals 242 or 244 increases to plus five volts, the potential at the junction 261 approaches the positive five volts level as this voltage is passed through the conducting crystal diode 248 or 250 to which the voltage is applied. The other crystal diode 248 or 250 stops conducting since its anode 252 or 256 becomes more negative than the junction 261. As a result, a positive potential of five volts appears at the output terminal 246.

If positive five volt signals are fed simultaneously to both input terminals 242 and 244, a positive potential of five volts appears at the output terminal 246, since both crystal diodes 248 and 250 will remain conducting. Thus the buffer 240 functions to pass the most positive signal received via the input terminals 242 and 244.

Although buffer 240 is shown with only two input terminals, it should be realized that more input terminals can be connected via crystal diodes to junction 261.

Pulse amplifier

The symbol for a representative pulse amplifier is shown in FIG. 7a. When a positive pulse is fed to the pulse amplifier 260 via the input terminal 262, the pulse amplifier 260 functions to transmit a positive pulse which swings from minus ten to plus five volts from its positive output terminal 264, and a negative pulse which swings from plus five to minus ten volts from its negative output terminal 266. At all other times, the pulse amplifier 260 has a negative potential of ten volts at its positive output terminal 264, and a positive potential of five volts at its negative output terminal 266.

The detailed circuitry of the pulse amplifier 260 is shown in FIG. 7b. The pulse amplifier 260 includes the vacuum tube 268, the pulse transformer 270 and associated circuitry. The vacuum tube 268 comprises the cathode 272, the grid 274 and the anode 276. The pulse transformer comprises the primary winding 278 and the secondary windings 280 and 282.

The crystal diode 284 couples the grid 274 of the vacuum tube 268 to the input terminal 262, the anode 286 of the crystal diode 284 being coupled to the input terminal 262, and the cathode 288 being coupled to the grid 274. The negative supply bus 70 is coupled to the grid 274 via the resistor 290 and tends to make the crystal diode 284 conductive. The grid 274 and the cathode 288 of the crystal diode 284 are also coupled to the cathode 294 of the crystal diode 292, whose anode 296 is coupled to the negative supply bus 5. The crystal diode 292 clamps the grid 274 at a potential of minus five volts thus preventing the voltage applied to the grid 274 from becoming more negative than minus five volts.

When a voltage more positive than minus five volts is transmitted to the input terminal 262, the crystal diode 284 conducts and the voltage is applied to the grid 274. Since the crystal diode 292 clamps the grid 274 and the cathode 288 of the crystal diode 284 at minus five volts any voltage more negative than minus five volts will cause the crystal diode 284 to become nonconductive, and that input voltage will be blocked at the crystal diode 284. Thus, the clamping action of the crystal diode 292 will not affect the circuitry which supplies the input voltage.

The cathode 272 of the vacuum tube 268 is connected to ground potential. The anode 276 of the vacuum tube 288 is coupled by the primary winding 278 of the pulse transformer 270 to the positive supply bus 250. The outer ends of the secondary windings 280 and 282 of the pulse transformer 270 are coupled respectively to the positive output terminal 264 and the negative output terminal 266. The inner ends of the secondary windings 280 and 282 are coupled respectively to the negative supply bus 10 and the positive supply bus 5.

A positive pulse which is fed to the grid 274 of the vacuum tube 268 will be inverted at the primary winding 278 of the pulse transformer 270 which is wound to produce a positive pulse in the secondary winding 280 and a negative pulse in the secondary winding 282. These pulses respectively drive the positive output terminal 264 up to a positive five volts potential and the negative output terminal 266 down to a negative ten volts potential because of the circuit parameters.

When the vacuum tube 268 is nonconducting, the negative ten volts potential is fed through the secondary winding 280 and appears at the positive output terminal 264. At the same time, the positive five volts potential is fed through the secondary winding 282 to the negative output terminal 266. These latter conditions are the normally existing conditions at the output terminals 264 and 266.

Delay line

The symbol for a representative electrical delay line 300 which is a lumped parameter type delay line and which functions to delay received pulses for discrete periods of time, is shown in FIG. 8a.

The delay line 300 comprises the input terminal 302, the output terminal 304, and a plurality of taps 306a, 306b and 306n. A pulse which is fed via the input terminal 302 to the delay line 300 will be delayed for an increasing number of pulse times before successively appearing at the taps 306a, 306b and 306n. When the pulse reaches the output terminal 304, the total delay provided by the delay line 300 has been applied. In the text which follows, the specific number of pulse-times delay which is encountered before a pulse travels from the input terminal to a tap of the delay line will be stated.

The delay line 300 shown, schematically, in FIG. 8b comprises a plurality of inductors 308 connected in series, with the associated capacitors 310 which couple a point 312 on each inductor 308 to ground. A signal is fed into the delay line 300 at the input terminal 302 and the maximum delay occurs at the output terminal 304. The taps 306a, 306b and 306n are each connected to one of the points 312 and provide varied delays. The delay line 300 is terminated by a resistor 314 in order to prevent reflections. Although in the delay line of FIG. 8b a tap is shown connected to each of the points 312, it should be understood that in actual practice there are ordinarily several untapped points 312 between successive taps.

Reshaper

A reshaper of the type used in the apparatus is an electronic circuit which functions to reshape and retime positive pulses which have become poorly shaped and attenuated.

The symbol for a representative reshaper 320 is illustrated in FIG. 9a and comprises one or more input terminals of which the input terminals 322 and 324 are shown, timing terminal 326 which receives reshaping and retiming pulses (also designated clocking or C pulses), positive output terminal 328, negative output terminal 330, and blocking terminal 332 through which signals may be sent to make the reshaper 320 inoperative.

Except when positive pulses are fed to the input terminals 322 and 324 of the reshaper 320, a negative potential of ten volts is present at the positive output terminal 328 and a positive potential of five volts exists at the negative output terminal 330.

When a pulse is fed to the reshaper 320 via one or both of the input terminals 322 and 324, the pulse is reshaped by a clock pulse (received via the terminal 326), which is timed to delay the reshaped pulse for one-quarter of a pulse time, and is then transmitted from the reshaper 320 via the positive output terminal 328. While the positive pulse is being transmitted from the positive output terminal 328, a negative pulse is transmitted from the negative output terminal 330.

The detailed circuitry of the reshaper 320 is illustrated in FIG. 9b in which use is made of logical symbols previously described.

The reshaper 320 comprises the buffer 334, the gate 336 and the pulse amplifier 338 connected in series. A positive pulse which is fed via one or both of the input terminals 322 and 324 of the buffer 334 is passed to the gate 336. Signals may also be fed via the blocking terminal 332 to the gate 336 and if the signal is negative, the gate 336 is blocked and the reshaper 320 is inoperative. The blocking terminal 332 is generally absent and if present usually receives a positive signal.

A series of identical clock pulses which are generated in the clock pulse generator of a timer are transmitted to the gate 336 via the clock terminal 326. The clock pulses are equal in magnitude and width to the desired shape and timing of the pulses which are to be reshaped and retimed. The clock pulses are timed so that the starting time of each clock pulse coincides approximately with the center of the pulse it is intended to reshape. This is done to assure that the pulse to be reshaped will have reached its maximum amplitude by the time the leading edge of a clock pulse arrives at the gate 336. Since in many cases the pulse to be reshaped is originally produced in synchronism with a clock pulse thus has approximately the same width as a clock pulse, i.e., one-half pulse time, its center will be one-quarter pulse time later than the leading edge of the clock pulse with which it is in synchronism. Hence its leading edge after passing through the reshaper will be synchronized with its original pulse center which is one-quarter pulse time later than its original leading edge, and on this basis it may be said that a reshaper introduces a one-quarter pulse time delay in the signals passing through it as indicated in FIGURE 3 where the input pulses on terminal 42 appear one-quarter pulse time later at the outputs of reshaper 84.

When the attenuated positive pulse reaches its full magnitude at the gate 336, the coinciding clock pulse is gated through to the pulse amplifier 338 and is amplified and causes a positive pulse to be transmitted from the positive output terminal 328, and a negative pulse to be transmitted from the negative output terminal 330 at the same time.

The positive output terminal 328 is also coupled to one input of the buffer 334 so that a positive signal which appears at the positive output terminal 328 is regenerative and will continue to exist until the clock pulse terminates at the gate 336. This effectively permits the entire clock pulse to be gated through the gate 336, even though the original pulse has decayed before the end of the clock pulse.

Stated more generally, a clock pulse is passed through the gate 336 from the earliest coincidence of that clock pulse with the full magnitude of the attenuated pulse until the termination of that clock pulse. As a result, a clock pulse is substituted for the attenuated pulse in the system after a delay of one-quarter of a pulse time.

There will now be obvious to those skilled in the art many modifications and variations utilizing the principles set forth and realizing many or all of the objects and advantages of the circuits described but which do not depart essentially from the spirit of the invention.

What is claimed is:

1. Apparatus for selectively performing a unit change upon a binary-coded decimal number, said apparatus comprising control means for determining whether the type of unit change is a unit addition or a unit subtraction, a dynamic storage register for storing said number, an arithmetic unit for performing the unit change on the digit of lowest denominational order of said number, said dynamic storage register and said arithmetic unit connected in series to form a closed loop, said control means conditioning said arithmetic unit to perform the predetermined type of unit change, and a sampler for testing the magnitude of each decimal denominational digit of the original operand number stored in said storage register to determine whether or not the particular decimal digit is of a selected magnitude set into said sampler by said control means according to whether addition or subtraction is required, said arithmetic unit being controlled by said sampler when a given tested decimal digit subject to the unit change is of said selected magnitude, to further change such given decimal digit to the properly coded decimal digit and to enable a like unit change in the decimal digit of the next higher denominational order, the unit and further changes being performed on a given decimal digit in a single pass.

2. Apparatus for generating a sequence of decimal numbers in which each decimal number is composed of a plurality of decimal digits, each decimal digit being from a series whose limits are zero and nine and each decimal digit being represented by a coded combination of binary digits, said apparatus comprising a dynamic storage register for storing a decimal number composed of binary-coded decimal digits, arithmetic means connected in a closed loop with said storage register and settable to increase or to decrease the magnitude of the stored decimal by a unit value, control means to set said arithmetic means and to institute therein a unit value change of a stored decimal number, a testing means for testing each decimal denominational digit of the original operand number stored in said storage register to determine whether or not the particular decimal digit is of a selected magnitude, namely nine in the case of addition and zero in the case of subtraction, said arithmetic unit being controlled by said sampler when a given tested decimal digit subject to the unit change is of said selected magnitude, to further change such given decimal digit to zero in the case of addition and nine in the case of subtraction, and to institute a tens transfer unit value change in the digit representation of the succeeding denominational order, the unit and further changes being performed on a given decimal digit in a single pass.

3. Apparatus for selectively performing a unit change upon an excess-three binary-coded decimal number, said unit change being in the nature of adding to or subtracting from the least significant decimal digit of said number the numerical pattern 0001 rather than 0100, said apparatus comprising control means for determining whether the type of unit change is a unit addition or a unit subtraction, storage means for storing the excess-three binary-coded decimal number, changing means for performing the unit change of the aforesaid nature on the decimal digit of the lowest denominational order of said binary-coded decimal number, including means providing the bit 1 in the pattern 0001 rather than 0100 for operation on the least significant decimal digit of said number, said control means conditioning said changing means to perform the unit change in the desired direction, and means for testing the magnitude of the decimal digit in each denominational order of the original operand binary-coded decimal number stored in said storage means, to determine whether or not the particular decimal digit is of a selected magnitude set into said testing means by said control means according to whether addition or subtraction is required, said changing means being controlled by said testing means when a given tested decimal digit subject to the unit change is of said selected magnitude, to further change such given decimal digit to produce a properly coded decimal digit and to make a like unit change of the aforesaid nature in the decimal digit of the next higher denominational order, the unit and further changes being performed on a given decimal digit in a single pass.

4. Apparatus for selectively performing a unit change upon an excess-three binary-coded decimal number, said unit change being in the nature of adding to or subtracting from the least significant decimal digit of said number the numerical pattern 0001 rather than 0100, said apparatus comprising control means for determining whether the type of unit change is a unit addition or a unit subtraction, storage means for storing the excess-three binary-coded decimal number, changing means for performing the unit change of the aforesaid nature on the decimal digit of the lowest denominational order of said binary-coded decimal number, including means providing the bit 1 in the pattern 0001 rather than 0100 for operation on the least significant decimal digit of said number, said control means conditioning said changing means to perform the unit change in the desired direction, and means for testing the magnitude of the two most significant bits of the decimal digit in each denominational order of the original operand binary-coded decimal number stored in said storage means, to determine whether or not the particular decimal digit is of a selected magnitude set into said testing means by said control means, namely nine in the case of addition and zero in the case of substraction, said changing means being controlled by said testing means when a given tested decimal digit subject to the unit change is of said selected magnitude, to further change such given decimal digit to produce an excess-three coded zero in the case of addition and an excess-three coded nine in the case of subtraction, and to make a like unit change of the aforesaid nature in the decimal digit of the next higher denominational order, the unit and further changes being performed on a given decimal digit in a single pass.

5. Apparatus for selectively performing a unit change upon a binary-coded decimal number represented in an excess code as distinguished from straight binary code, said unit change being in the nature of adding to or subtracting from the least significant decimal digit of said number the numerical pattern 0001 rather than the pattern for the decimal digit one in said excess code, said apparatus comprising control means for determining whether the type of unit change is a unit addition or a unit subtraction, storage means for storing the excess binary-coded decimal number, changing means for performing the unit change of the aforesaid nature on the decimal digit of the lowest denominational order of said binary-coded decimal number, including means providing the bit 1 in the pattern 0001 rather than the pattern for the decimal digit one in said excess code for operation on the least significant decimal digit of said number, said control means conditioning said changing means to perform the unit change in the desired direction, and means for testing the magnitude of the decimal digit in each denominational order of the original operand binary-coded decimal number stored in said storage means, to determine whether or not the particular decimal digit is of a selected magnitude set into said testing means by said control means according to whether addition or substraction is required, means being controlled by said testing means when a given tested decimal digit subject to the unit change is of said selected magnitude, to further change such given decimal digit to produce a properly coded decimal digit and to make a like unit change of the aforesaid nature in the decimal digit of the next higher denominational order, the unit and further changes being performed on a given decimal digit in a single pass.

6. Apparatus for selectively performing a unit change upon a binary-coded decimal number represented in an excess code as distinguished from straight binary code, said unit change being in the nature of adding to or subtracting from the least significant decimal digit of said number the numerical pattern 0001 rather than the pattern for the decimal digit one in said excess code, said apparatus comprising control means for determining whether the type of unit change is a unit addition or a unit substraction, storage means for storing the excess binary-coded decimal number, changing means for performing the unit change of the aforesaid nature on the decimal digit of the lowest denominational order of said binary-coded decimal number, including means providing the bit 1 in the pattern 0001 rather than the pattern for the decimal digit one in said excess code for operation on the least significant decimal digit of said number, said control means conditioning said changing means to perform the unit change in the desired direction, and means for testing the magnitude of the decimal digit in each denominational order of the original operand binary-coded decimal number stored in said storage means, to determine whether or not the particular decimal digit is of a selected magnitude set into said testing means by said control means, namely nine in the case of addition or zero in the case of substraction, said changing means being controlled by said testing means when a given tested decimal digit subject to the unit change is of said selected magnitude, to further change such given decimal digit to produce an excess coded zero in the case of addition and an excess coded nine in the case of subtraction, and to make a like unit change of the aforesaid nature in the decimal digit of the next higher denominational order, the unit and further changes being performed on a given decimal digit in a single pass.

References Cited in the file of this patent

UNITED STATES PATENTS

| | | |
|---|---|---|
| 2,609,143 | Stibitz | Sept. 2, 1952 |
| 2,665,068 | Williams | Jan. 5, 1954 |
| 2,668,661 | Stibitz | Feb. 9, 1954 |
| 2,686,299 | Eckert Jr. | Aug. 10, 1954 |
| 2,697,549 | Hobbs | Dec. 21, 1954 |
| 2,701,095 | Stibitz | Feb. 1, 1955 |
| 2,703,202 | Cartwright | Mar. 1, 1955 |
| 2,705,108 | Stone Jr. | Mar. 29, 1955 |
| 2,715,997 | Hill | Aug. 23, 1955 |
| 2,719,670 | Jacobs et al. | Oct. 4, 1955 |
| 2,724,780 | Harris | Nov. 22, 1955 |
| 2,750,114 | Crosman | June 12, 1956 |
| 2,754,059 | Wilcox Jr. | July 10, 1956 |
| 2,796,219 | Hill | June 18, 1957 |
| 2,803,401 | Nelson | Aug. 20, 1957 |
| 2,823,855 | Nelson | Feb. 18, 1958 |
| 2,872,107 | Burkhart | Feb. 3, 1959 |

OTHER REFERENCES

Engineering Research Associates (E.R.A.), High Speed Computing Devices, McGraw-Hill Book Co., Inc., New York, copyright 1950, pages 290–293.

Townsend: Serial Digital Adders for a Variable Radix of Notation, Electronic Engineering (British), Oct. 1953, pages 410 to 416.